(12) United States Patent
Bakhmutsky

(10) Patent No.: US 6,400,764 B1
(45) Date of Patent: Jun. 4, 2002

(54) MOTION ESTIMATION METHOD FEATURING ORTHOGONAL-SUM CONCURRENT MULTI MATCHING

(75) Inventor: Michael Bakhmutsky, Spring Valley, NY (US)

(73) Assignee: Koninklijke Philips Electronics N. V., New York, NY (US)

( * ) Notice: Subject to any disclaimer, the term of this patent is extended or adjusted under 35 U.S.C. 154(b) by 0 days.

(21) Appl. No.: 09/287,160

(22) Filed: Apr. 6, 1999

(51) Int. Cl.[7] ................................................ A04B 1/66

(52) U.S. Cl. .................................. 375/240.16; 382/236

(58) Field of Search ....................... 375/240.16, 240.17, 375/240.24, 240; 348/402.1, 407.1, 416.1, 417.1, 409.1, 415.1, 699; 382/166, 235, 236

(56) References Cited

U.S. PATENT DOCUMENTS

| | | | | |
|---|---|---|---|---|
| 5,638,128 A | * | 6/1997 | Hoogenboom et al. | 375/240.15 |
| 5,652,625 A | * | 7/1997 | Chen et al. ............ | 375/240.16 |
| 5,870,500 A | * | 2/1999 | Daoudi et al. ............... | 382/236 |
| 6,192,148 B1 | * | 2/2001 | Lin ............................. | 382/166 |

OTHER PUBLICATIONS

PHA 23,652, U.S. Ser. No. 09/287,161, filed Apr. 6, 1999.
PHA 23,653, U.S. Ser. No. 09/287,165, filed Apr. 6, 1999.

* cited by examiner

Primary Examiner—Chris Kelley
Assistant Examiner—Gims Philippe
(74) Attorney, Agent, or Firm—Russell Gross

(57) ABSTRACT

A method for determining a best match between a first pixel array in a picture currently being encoded and a plurality of second pixel arrays in a search region of a reference picture, wherein each of the first and second pixel arrays includes a plurality R of rows and a plurality C of columns of individual pixel values. The method includes the steps of providing a first full orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array; providing a plurality of partial orthogonal-sum signatures for respective ones of the plurality of second pixel arrays, each of the plurality of partial orthogonal-sum signatures being comprised of a set of partial horizontal sums representative of the sums of the individual pixel values of a plurality M of the rows of a respective one of the second pixel arrays and a set of partial vertical sums representative of the sums of the individual pixel values of a plurality N of the columns of a respective one of the second pixel arrays, wherein $M<R$ and $N<C$; concurrently computing a plurality of second full orthogonal-sum signatures for the respective ones of the plurality of second pixel arrays using the plurality of partial orthogonal-sum signatures; and, comparing the first full orthogonal-sum signature with each of the second full orthogonal-sum signatures in order to determine the best match between the first and second pixel arrays. In a presently preferred embodiment, $M=R-1$ and $N=C-1$; the set of partial horizontal sums is representative of the sums of the individual pixel values contained in N columns of R+1 rows of an (C+1)-by-(R+1) pixel array that encompasses all of the second pixel arrays, and the set of partial vertical sums is representative of the sums of the individual pixel values contained in M rows of C+1 columns of the (C+1)-by-(R+1) pixel array; the R+1 rows and the C+1 columns collectively comprise the (C+1)-by-(R+1) pixel array that encompasses all of the second pixel arrays; and, the M rows and N columns are centered in the (C+1)-by-(R+1) pixel array. Also disclosed is a device, e.g., a motion estimation search engine of a digital video encoder, that implements the method of the present invention.

32 Claims, 6 Drawing Sheets

|    | C1 | C2 | C3 | C4 | C5 | C6 | C7 | C8 | C9 |
|----|----|----|----|----|----|----|----|----|----|
| R1 |    | SH1 | | | | | | | |
| R2 |    | SH2 | | | | | | | |
| R3 |    | SH3 | | | | | | | |
| R4 |    | SH4 | | | | | | | |
| R5 |    | SH5 | | | | | | | |
| R6 |    | SH6 | | | | | | | |
| R7 |    | SH7 | | | | | | | |
| R8 |    | SH8 | | | | | | | |
| R9 |    | SH9 | | | | | | | |

FIG. 3A

|    | C1  | C2  | C3  | C4  | C5  | C6  | C7  | C8  | C9  |
|----|-----|-----|-----|-----|-----|-----|-----|-----|-----|
| R1 |     |     |     |     |     |     |     |     |     |
| R2 | SV1 | SV2 | SV3 | SV4 | SV5 | SV6 | SV7 | SV8 | SV9 |
| R3 |     |     |     |     |     |     |     |     |     |
| R4 |     |     |     |     |     |     |     |     |     |
| R5 |     |     |     |     |     |     |     |     |     |
| R6 |     |     |     |     |     |     |     |     |     |
| R7 |     |     |     |     |     |     |     |     |     |
| R8 |     |     |     |     |     |     |     |     |     |
| R9 |     |     |     |     |     |     |     |     |     |

FIG. 3B

MOTION ESTIMATION METHOD FEATURING ORTHOGONAL-SUM CONCURRENT MULTI MATCHING

BACKGROUND OF THE INVENTION

The present invention relates generally to digital video compression, and, more particularly, to a hardware-efficient method of motion estimation in digital video encoders that is simpler, faster, and less expensive than the presently available technology.

Many different compression algorithms have been developed in the past for digitally encoding video and audio information (hereinafter referred to generically as "digital video data stream") in order to minimize the bandwidth required to transmit this digital video data stream for a given picture quality. Several multimedia specification committees have established and proposed standards for encoding/compressing and decoding/decompressing audio and video information. The most widely accepted international standards have been proposed by the Moving Pictures Expert Group (MPEG), and are generally referred to as the MPEG-1 and MPEG-2 standards. Officially, the MPEG-1 standard is specified in the ISO/IEC 11172-2 standard specification document, which is herein incorporated by reference, and the MPEG-2 standard is specified in the ISO/IEC 13818-2 standard specification document, which is also herein incorporated by reference. These MPEG standards for moving picture compression are used in a variety of current video playback products, including digital versatile (or video) disk (DVD) players, multimedia PCs having DVD playback capability, and satellite broadcast digital video. More recently, the Advanced Television Standards Committee (ATSC) announced that the MPEG-2 standard will be used as the standard for Digital HDTV transmission over terrestrial and cable television networks. The ATSC published the *Guide to the Use of the ATSC Digital Television Standard* on Oct. 4, 1995, and this publication is also herein incorporated by reference.

In general, in accordance with the MPEG standards, the audio and video data comprising a multimedia data stream (or "bit stream") are encoded/compressed in an intelligent manner using a compression technique generally known as "motion coding". More particularly, rather than transmitting each video frame in its entirety, MPEG uses motion estimation for only those parts of sequential pictures that vary due to motion, where possible. In general, the picture elements or "pixels" of a picture are specified relative to those of a previously transmitted reference or "anchor" picture using differential or "residual" video, as well as so-called "motion vectors" that specify the location of a 16-by-16 array of pixels or "macroblock" within the current picture relative to its original location within the anchor picture. Three main types of video frames or pictures are specified by MPEG, namely, I-type, P-type, and B-type pictures.

An I-type picture is coded using only the information contained in that picture, and hence, is referred to as an "intra-coded" or simply, "intra" picture.

A P-type picture is coded/compressed using motion compensated prediction (or "motion estimation") based upon information from a past reference (or "anchor") picture (either I-type or P-type), and hence, is referred to as a "predictive" or "predicted" picture.

A B-type picture is coded/compressed using motion compensated prediction (or "motion estimation") based upon information from either a past and or a future reference picture (either I-type or P-type), or both, and hence, is referred to as a "bidirectional" picture. B-type pictures are usually inserted between I-type or P-type pictures, or combinations of either.

The term "intra picture" is used herein to refer to I-type pictures, and the term "non-intra picture" is used herein to refer to both P-type and B-type pictures. It should be mentioned that although the frame rate of the video data represented by an MPEG bit stream is constant, the amount of data required to represent each frame can be different, e.g., so that one frame of video data (e.g., $\frac{1}{30}$ of a second of playback time) can be represented by x bytes of encoded data, while another frame of video data can be represented by only a fraction (e.g., 5%) of x bytes of encoded data. Since the frame update rate is constant during playback, the data rate is variable.

In general, the encoding of an MPEG video data stream requires a number of steps. The first of these steps consists of partitioning each picture into macroblocks. Next, in theory, each macroblock of each "non-intra" picture in the MPEG video data stream is compared with all possible 16-by-16 pixel arrays located within specified vertical and horizontal search ranges of the current macroblock's corresponding location in the anchor picture(s). This theoretical "full search algorithm" (i.e., searching through every possible block in the search region for the best match) always produces the best match, but is seldom used in real-world applications because of the tremendous amount of calculations that would be required, e.g., for a block size of N×N and a search region of (N+2w) by (N+2w), the distortion function MAE has to be calculated $(2w+1)^2$ times for each block, which is a tremendous amount of calculations. Rather, it is used only as a reference or benchmark to enable comparison of different more practical motion estimation algorithms that can be executed far faster and with far fewer computations. These more practical motion estimation algorithms are generally referred to as "fast search algorithms".

The aforementioned search or "motion estimation" procedure, for a given prediction mode, results in a motion vector that corresponds to the position of the closest-matching macroblock (according to a specified matching criterion) in the anchor picture within the specified search range. Once the prediction mode and motion vector(s) have been determined, the pixel values of the closest-matching macroblock are subtracted from the corresponding pixels of the current macroblock, and the resulting 16-by-16 array of differential pixels is then transformed into 8-by-8 "blocks," on each of which is performed a discrete cosine transform (DCT), the resulting coefficients of which are each quantized and Huffman-encoded (as are the prediction type, motion vectors, and other information pertaining to the macroblock) to generate the MPEG bit stream. If no adequate macroblock match is detected in the anchor picture, or if the current picture is an intra, or "I-" picture, the above procedures are performed on the actual pixels of the current macroblock (i.e., no difference is taken with respect to pixels in any other picture), and the macroblock is designated an "intra" macroblock.

For all MPEG-2 prediction modes, the fundamental technique of motion estimation consists of comparing the current macroblock with a given 16-by-16 pixel array in the anchor picture, estimating the quality of the match according to the specified metric, and repeating this procedure for every such 16-by-16 pixel array located within the search range. The hardware or software apparatus that performs this search is usually termed the "search engine," and there exists a number of well-known criteria for determining the quality of the match. Among the best-known criteria are the Minimum Absolute Error (MAE), in which the metic consists of the sum of the absolute values of the differences of each of the 256 pixels in the macroblock with the corresponding pixel in the matching anchor picture macroblock; and the Minimum Square Error (MSE), in which the metric consists of the sum of the squares of the above pixel differences. In either case, the match having the smallest value of the corresponding sum is selected as the best match within the specified search range, and its horizontal and vertical positions relative to the current macroblock therefore constitute the motion vector. If the resulting minimum sum is nevertheless deemed too large, a suitable match does not exist for the current macroblock, and it is coded as an intra macroblock. For the purposes of the present invention, either of the above two criteria, or any other suitable criterion, may be used.

The various fast search algorithms evaluate the distortion function (e.g., the MAE function) only at a predetermined subset of the candidate motion vector locations within the search region, thereby reducing the overall computational effort. These algorithms are based on the assumption that the distortion measure is monotonically decreasing in the direction of the best match prediction. Even though this assumption is not always true, it can still find a suboptimal motion vector with much less computation.

The most commonly used approach to motion estimation is a hybrid approach generally divided into several processing steps. First, the image can be decimated by pixel averaging. Next, the fast search algorithm operating on a smaller number of pixels is performed, producing a result in the vicinity of the best match. Then, a full search algorithm in a smaller search region around the obtained motion vector is performed. If half-pel vectors are required (as with MPEG-2), a half-pel search is performed as a separate step or is combined with the limited full search.

Even with the great savings that can be achieved in the hybrid approach to motion estimation, an enormous amount of computations still have to be performed for each iteration of computing MAE. Assuming that the distortion function has to be computed every clock cycle for every block offset, which is desirable in demanding applications such as MPEG-2 HDTV where motion block size is 16-by-16, a distortion function computational unit (DFCU) will consist of a number of simpler circuits of increasing bit width starting from 8 (8-bit luminance data is used for motion estimation) to produce MAE. This number will be equal to the sum of the following: 256 subtraction circuits, 256 absolute value compute circuits, 255 summation circuits of increasing bit width, for a total of 757 circuits of increasing bit width starting with 8, per DFCU.

Depending on picture resolution, a number of these extremely complex units will be required for a practical system. Using a smaller number of circuits within a DFCU in order to reuse its hardware is possible, but will substantially increase processing time and may not be acceptable in demanding applications such as HDTV. In this case, the number of DFCUs will simply have to be increased to compensate by enhanced parallel processing.

The first step in the hybrid approach to motion estimation (rough search) is usually the most demanding step in terms of hardware utilization because it has to cover the largest search region in order to produce a reasonably accurate match.

Based on the above and foregoing, there presently exists a need in the art for a method for motion estimation that enhances the speed at which motion estimation can be performed, that greatly reduces the amount and complexity of the motion estimation or DFCU hardware required to perform motion estimation, and that provides for significant picture quality improvement at a reasonable cost. The motion estimation method disclosed by the present inventor in co-pending application Ser. No. 09/287,161, filed concurrently herewith, and entitled "Motion Estimation Method Using Orthogonal-Sum Block Matching", produces a much smaller amount of data that has to be compared in order to identify a best match, and leads to a substantial reduction in the motion estimation search engine hardware requirements, by searching for best matches by comparing unique macroblock signatures rather than by comparing the individual luminance values of the collocated pixels in the current macroblock and the search region. However, this inventive method does not directly address the problem of accelerating the motion estimation search procedure. The method and device of the present invention directly addresses this problem by extensively reusing the orthogonal sums that are computed for the macroblocks in the search region of the reference picture in order to produce multiple high-quality motion estimation search results in a single try.

SUMMARY OF THE INVENTION

The present invention encompasses a method for determining a best match between a first pixel array in a picture currently being encoded and a plurality of second pixel arrays in a search region of a reference picture, wherein each of the first and second pixel arrays includes a plurality R of rows and a plurality C of columns of individual pixel values.

The method includes the steps of providing a first full orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array; providing a plurality of partial orthogonal-sum signatures for respective ones of the plurality of second pixel arrays, each of the plurality of partial orthogonal-sum signatures being comprised of a set of partial horizontal sums representative of the sums of the individual pixel values of a plurality M of the rows of a respective one of the second pixel arrays and a set of partial vertical sums representative of the sums of the individual pixel values of a plurality N of the columns of a respective one of the second pixel arrays, wherein M<R and N<C; concurrently computing a plurality of second full orthogonal-sum signatures for the respective ones of the plurality of second pixel arrays using the plurality of partial orthogonal-sum signatures; and, comparing the first full orthogonal-sum signature with each of the second full orthogonal-sum signatures in order to determine the best match between the first and second pixel arrays.

In a presently preferred embodiment, N=C−1, and M=R−1; the set of partial horizontal sums is representative of the sums of the individual pixel values contained in N columns of R+1 rows of an (C+1)-by-(R+1) pixel array that encompasses all of the second pixel arrays, and the set of partial vertical sums is representative of the sums of the individual pixel values contained in M rows of C+1 columns of the (C+1)-by-(R+1) pixel array; the R+1 rows and the C+1 columns collectively comprise the (C+1)-by-(R+1) pixel array that encompasses all of the second pixel arrays; and, the M rows and N columns are centered in the (C+1)-by-(R+1) pixel array, where C can be equal or unequal to R, and M can be equal or unequal to N.

The present invention also encompasses a device, e.g., a motion estimation search engine of a digital video encoder, that implements the method of the present invention.

BRIEF DESCRIPTION OF THE DRAWINGS

These and other objects, features, and advantages of the present invention will be readily understood from the following detailed description taken in conjunction with the accompanying drawings, in which:

FIG. 2A is a diagram that depicts the general structure and pixel numbering configuration of an 8-by-8 pixel array encompassed by the 9-by-9 pixel array depicted in FIG. 1;

FIG. 2B is a diagram that depicts the location and structure of an 8-by-8 pixel array whose origin is the pixel located at the coordinates R1, C1 of the 9-by-9 pixel array depicted in FIG. 1;

FIG. 2C is a diagram that depicts the location and structure of an 8-by-8 pixel array whose origin is the pixel located at the coordinates R1, C2 of the 9-by-9 pixel array depicted in FIG. 1;

FIG. 3A is a diagram that depicts a set of partial horizontal sums SH1–SH9 computed for the 9-by-9 pixel array depicted in FIG. 1 in accordance with the motion estimation method of an exemplary embodiment of the present invention;

FIG. 3B is a diagram that depicts a set of partial vertical sums SV1–SV9 computed for the 9-by-9 pixel array depicted in FIG. 1 in accordance with the motion estimation method of an exemplary embodiment of the present invention;

DETAILED DESCRIPTION OF THE INVENTION

Figures 1, 2:
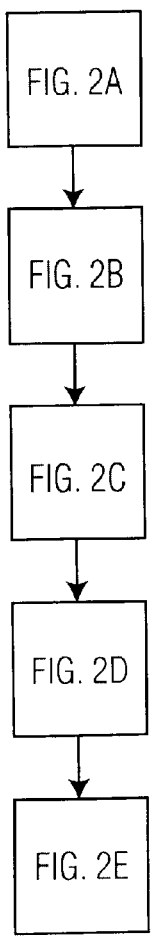
FIG. 1 is a diagram that depicts the general structure of a 9-by-9 pixel array in a search region of a reference picture.
FIG. 2 is a diagram that depicts the relationship between the arrays of FIGS. 2A–2B.

In overview, the motion estimation method of the present invention generally consists of the following steps.

First, a full orthogonal-sum signature of a macroblock currently being encoded is computed by computing a set of horizontal sums representative of the sums of the individual pixel values of the rows of that macroblock and a first set of vertical sums representative of the sums of the individual pixel values of the columns of that macroblock, in the manner disclosed in co-pending application Ser. No. 09/287,161, the disclosure of which is herein incorporated by reference.

Second, a plurality of partial orthogonal-sum signatures for respective ones of a plurality of reference pixel arrays contained in a search region of a reference picture are computed, each of the plurality of partial orthogonal-sum signatures being comprised of a set of partial horizontal sums representative of the sums of the individual pixel values of a plurality M of the rows of a respective one of the reference pixel arrays and a set of partial vertical sums representative of the sums of the individual pixel values of a plurality N of the columns of a respective one of the reference pixel arrays, wherein M<R and N<C.

Third, a plurality of full orthogonal-sum signatures for the respective ones of the plurality of reference pixel arrays are computed using the plurality of partial orthogonal-sum signatures. Finally, the full orthogonal-sum signature of the macroblock currently being encoded is compared with each of the full orthogonal-sum signatures of the reference pixel arrays in order to determine the best match between the macroblock and the reference pixel arrays.

In a presently preferred embodiment, N=C−1 and M=R−1, and the set of partial horizontal sums is representative of the sums of the individual pixel values contained in N columns of R+1 rows of an (C+1)-by-(R+1) pixel array that encompasses all of the reference pixel arrays, and the set of partial vertical sums is representative of the sums of the individual pixel values contained in M rows of C+1 columns of the (C+1)-by-(R+1) pixel array. The R+1 rows and the C+1 columns collectively comprise the (C+1)-by-(R+1) pixel array that encompasses all of the reference pixel arrays, and the M rows and N columns are centered in the (C+1)-by-(R+1) pixel array. It will be appreciated that C can be equal or unequal to R, and M can be equal or unequal to N.

The comparison step is performed using a prescribed best match search metric, e.g., a Minimum Absolute Error (MAE) search metric, although the present invention is not limited to this or any other particular implementation.

Preferably, the macroblock currently being encoded and each of the reference pixel arrays each constitute either a decimated or an undecimated macroblock having a structure defined by an MPEG standard, e.g., the MPEG-2 standard. Also, as will be described in detail hereinafter, the motion estimation method of the present invention is preferably implemented in a motion estimation search engine of a digital video encoder, e.g., an MPEG-2 digital video encoder.

Preferably, and advantageously, the step of providing a plurality of partial orthogonal-sum signatures is performed by first computing each of the partial horizontal sums and each of the partial vertical sums and then storing the computed partial horizontal and vertical sums in a memory of the motion estimation search engine, and the step of computing the plurality of second full orthogonal-sum signatures is performed by computing, for each of the second pixel arrays, a set of full vertical sums, by adding to each partial vertical sum, a pixel value from a selected row of the (C+1)-by-(R+1) pixel array that is above or below, as appropriate, the M rows; and, computing, for each of the second pixel arrays, a set of full horizontal sums, by adding to each partial horizontal sum, a pixel value from a selected column of the (C+1)-by-(R+1) pixel array that is above or below, as appropriate, the N columns. Preferably, and advantageously, both of the computing sub-steps are performed concurrently.

With reference now to FIGS. 1, 2, 2A–2E, and 3A–3D, an exemplary embodiment of the motion estimation method of the present invention will now be described. At the outset, it should be recognized that although the present invention is described in the context of 8-by-8 macroblocks, the present invention is, of course, not limited to any particular block size or structure. The 8-by-8 macroblock context is presented only for the purpose of ease of illustration of the principles of the present invention.

Figures 2A, 2B, 2C:
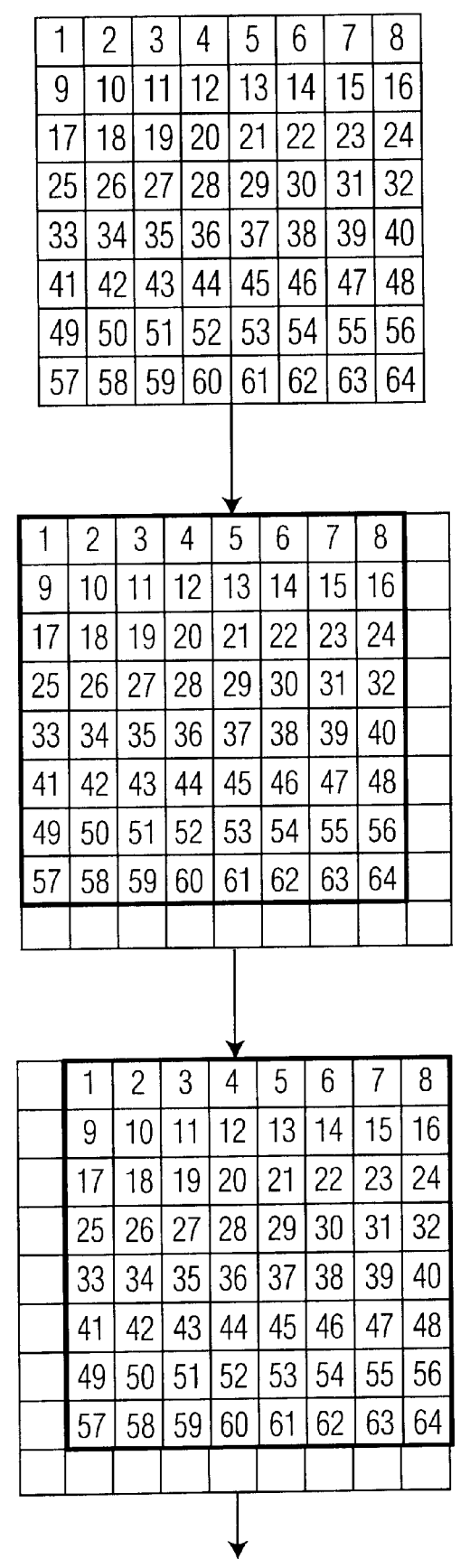
Figure 2D:
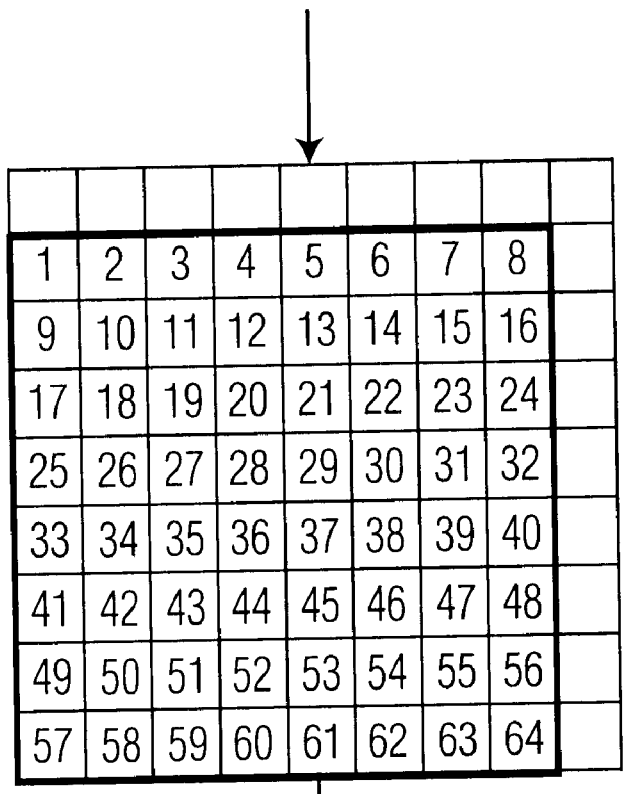
FIG. 2D is a diagram that depicts the location and structure of an 8-by-8 pixel array whose origin is the pixel located at the coordinates R2, C1 of the 9-by-9 pixel array depicted in FIG. 1.
Figure 2E:
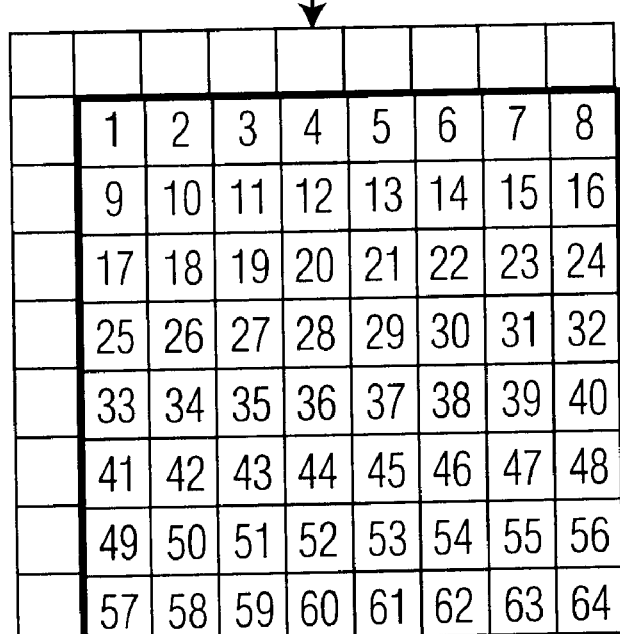
FIG. 2E is a diagram that depicts the location and structure of an 8-by-8 pixel array whose origin is the pixel located at the coordinates R2, C2 of the 9-by-9 pixel array depicted in FIG. 1.

More particularly, in FIG. 1 there can be seen a diagram that depicts the general structure of a 9-by-9 pixel array located in a specified search region of a reference picture. The 9-by-9 pixel array has 9 columns labeled C1–C9, and 9 rows labeled R1–R9. As will be further described below, four separate reference 8-by-8 pixel arrays (or reference macroblocks) having a structure and pixel numbering configuration as depicted in FIG. 2A are contained within (or encompassed by) the 9-by-9 pixel array, having origins at pixel coordinates R1-C1, R1-C2, R2-C1, and R2-C2 of the 9-by-9 pixel array, respectively, as indicated by the boxes marked with X's in FIG. 1. The reference 8-by-8 pixel array whose origin is R1-C1 is depicted in FIG. 2B; the reference 8-by-8 pixel array whose origin is R1-C2 is depicted in FIG. 2C; the reference 8-by-8 pixel array whose origin is R2-C1 is depicted in FIG. 2D; and, the reference 8-by-8 pixel array whose origin is R2-C2 is depicted in FIG. 2E.

As will be fully described hereinbelow, in accordance with the motion estimation method of the exemplary embodiment of the present invention, the full orthogonal-sum signatures of each of these four separate reference 8-by-8 pixel arrays are concurrently computed using previously computed partial horizontal sums and partial vertical sums stored in a memory, and then the full orthogonal-sum signatures of these four reference 8-by-8 pixel arrays are concurrently compared to the full orthogonal-sum signature of the macroblock currently being encoded, in order to determine which of these four reference 8-by-8 pixel arrays best matches the macroblock currently being encoded, e.g., in accordance with a prescribed search metric, such as Minimum Absolute Error (MAE). Of course, the present invention is not limited to any particular number of reference pixel arrays, e.g., the orthogonal-sum signatures of more or less than four reference pixel arrays can be concurrently computed, and then concurrently compared to the orthogonal-sum signature of the macroblock currently being encoded, in accordance with the principles of the present invention, to thereby concurrently perform multiple motion estimations in a single pass (try).

With reference now to FIGS. 3A–3D, a set of partial horizontal sums SH1–SH9 (FIG. 3A), and a set of partial vertical sums SV1–SV9 (FIG. 3B) are computed once and are then preferably stored in a memory within the motion estimation search engine. The partial horizontal sums SH1–SH9 represent the sums of the individual pixel (luminance) values of the middle seven columns C2–C8 located in the nine respective rows R1–R9 of the 9-by-9 pixel array depicted in FIG. 1. The partial vertical sums SV1–SV9 represent the sums of the individual pixel (luminance) values of the middle seven rows R2–R8 located in the nine respective columns C1–C9 of the 9-by-9 pixel array depicted in FIG. 1. As will be readily appreciated, the partial horizontal sums SH1–SH8 are common to the two reference 8-by-8 pixel arrays whose origins are R1-C1 and R1-C2 (depicted in FIGS. 2B and 2C, respectively), and the partial horizontal sums SH2–SH9 are common to the two reference 8-by-8 pixel arrays whose origins are R2-C1 and R2-C2 (depicted in FIGS. 2D and 2E, respectively); and, the partial vertical sums SV1–SV8 are common to the two reference 8-by-8 pixel arrays whose origins are R1-C1 and R2-C1 (depicted in FIGS. 2B and 2D, respectively), and the partial vertical sums SV2–SV9 are common to the two reference 8-by-8 pixel arrays whose origins are R1-C2 and R2-C2 (depicted in FIGS. 2C and 2E, respectively).

Figure 3C:
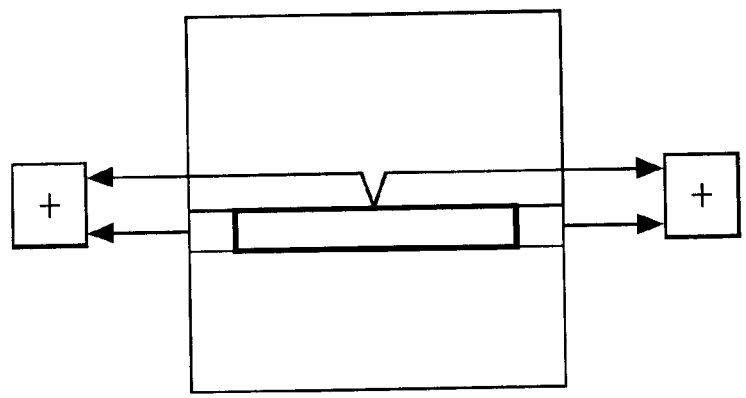
FIG. 3C is a diagram that illustrates the principle of adding a pixel value to the left or right, as appropriate, to a partial horizontal sum, in order to compute a full horizontal sum for a given 8-by-8 pixel array within the 9-by-9 pixel array depicted in FIG. 1, in accordance with the motion estimation method of the exemplary embodiment of the present invention.
Figure 3D:
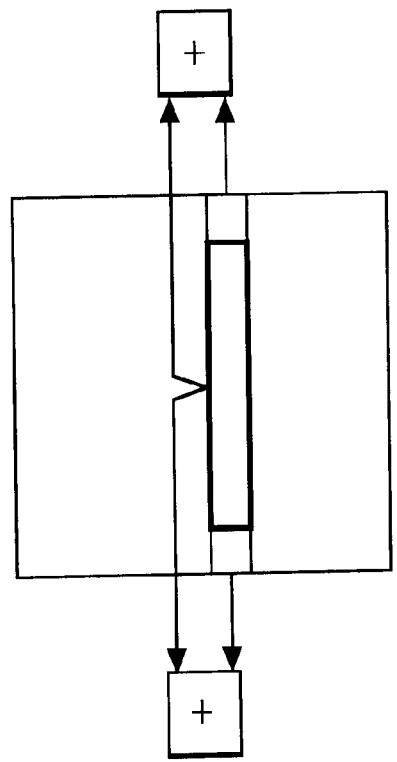
FIG. 3D is a diagram that illustrates the principle of adding a pixel value above or below, as appropriate, to a partial vertical sum, in order to compute a full vertical sum for a given 8-by-8 pixel array within the 9-by-9 pixel array depicted in FIG. 1, in accordance with the motion estimation method of the exemplary embodiment of the present invention; and, FIG. 4 is a block diagram of a motion estimation search engine that constitutes an exemplary embodiment of the present invention.

Then, as is schematically illustrated in FIG. 3C, the full horizontal sums for each of the rows of the four separate reference 8-by-8 pixel arrays can easily be computed by merely adding to the partial horizontal sums SH1–SH9 the pixel value to the left or right, as appropriate, of the partial horizontal sums SH1–SH9; and, as is schematically illustrated in FIG. 3D, the full vertical sums for each of the columns of the four separate reference 8-by-8 pixel arrays can be easily computed by merely adding to the partial vertical sums SV1–SV9 the pixel value above or below, as appropriate, the partial vertical sums SV1–SV9.

The resultant set of full horizontal and vertical sums for each of the four separate reference 8-by-8 pixel arrays (i.e., the resultant orthogonal-sum signatures of these reference pixel arrays) can then be concurrently compared to the orthogonal-sum signature of the macroblock currently being encoded in order to determine which one of these four reference pixel arrays constitutes the best match. The reference pixel array that is found to constitute the best match can then be selected for further processing in the motion estimation search engine. Thus, with the exemplary embodiment of the present invention, the full orthogonal-sum signatures of each of the four reference pixel arrays can be concurrently computed with a minimum of computation by extensively reusing the partial horizontal and partial vertical sums that are common to these four reference pixel arrays, and further, in a single try (pass), the one of the reference pixel arrays that constitutes the best match with the macroblock currently being encoded can be determined and selected for further processing.

Figure 4:
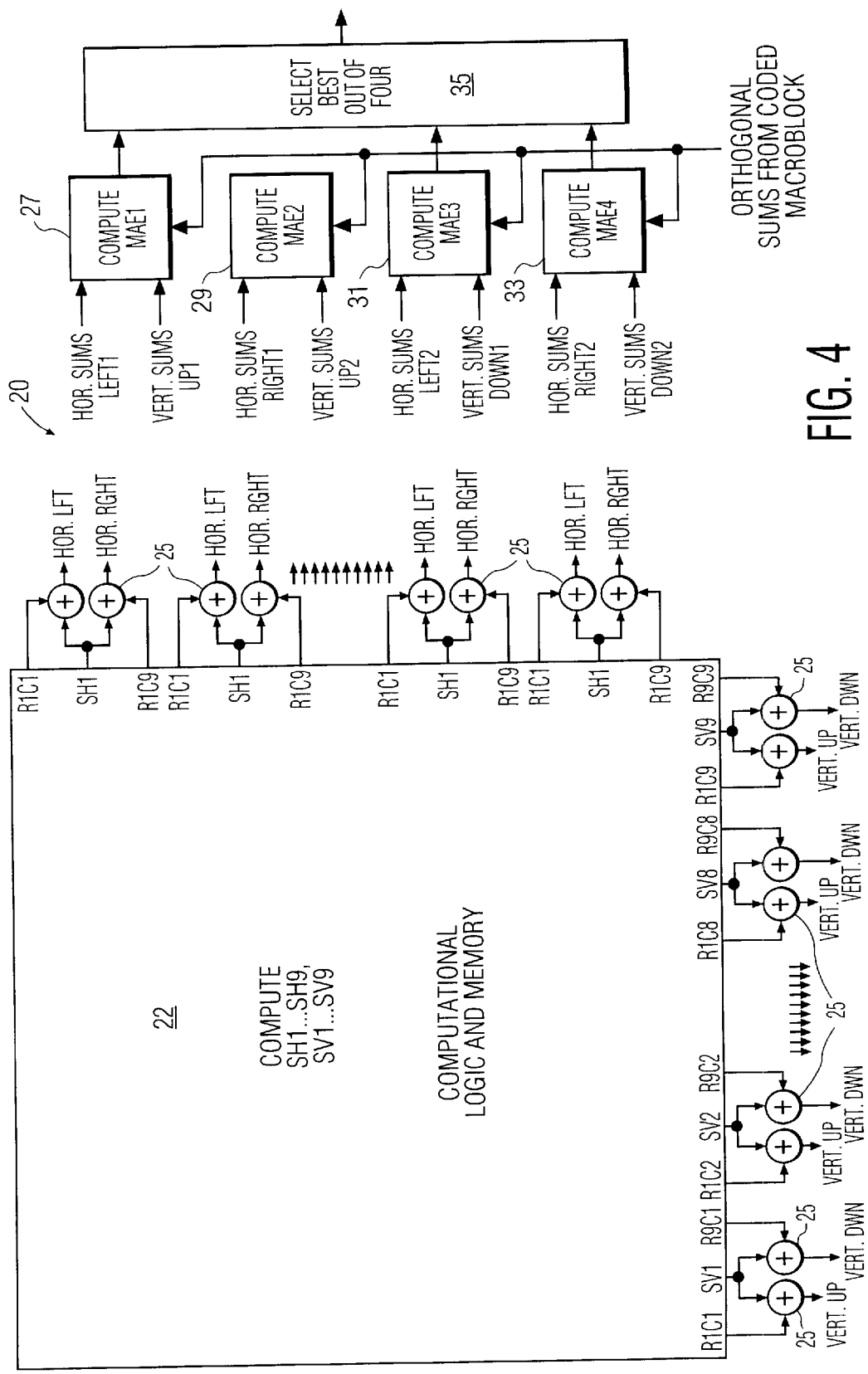

With reference now to FIG. 4, there can be seen a block diagram of a motion estimation search engine 20 for implementing the exemplary embodiment of the motion estimation method of the present invention. As can be seen, the search engine 20 includes computational logic and memory 22 that computes and stores the partial horizontal sums SH1–SH9 and the partial vertical sums SV1–SV9. The partial horizontal sums SH1–SH9 and the partial vertical sums SV1–SV9 are provided as outputs, and the individual pixel values located at coordinates R1C1-R9C1, R1C2-R1C8, R9C2-R9C8, and R1C9-R9C9 are each provided at two separate outputs. A plurality of adders 25 are provided for adding the appropriate ones of the individual pixel values R1C1-R9C1, R1C2-R1C8, R9C2-R9C9, and R1C9-R9C9 to the appropriate ones of the partial horizontal sums SH1–SH9 and partial vertical sums SV1–SV9 in order to produce the set of fill horizontal sums and the set of full vertical sums for each of the four reference pixel arrays to be compared with the macroblock currently being encoded ("coded macroblock").

In particular, it will be recognized that the full horizontal sums for the reference pixel array depicted in FIG. 2B (i.e., whose origin is R1-C1) are R1-C1+SH1; R2-C1+SH2; R3C1+SH3; R4C1+SH4; R5C1+SH5; R6C1+SH6; R7C1+SH7; and, R8C1+SH8. These full horizontal sums are labeled in FIG. 4 as "HOR. SUMS LEFT1". Similarly, the full vertical sums for the reference pixel array depicted in FIG. 2B are R1C1+SV1; R1C2+SV2; R1C3+SV3; R1C4+

SV4; R1C5+SV5; R1C6+SV6; R1C7+SV7; and, R1 C8+SV8. These full vertical sums are labeled in FIG. 4 as "VERT. SUMS UP1". The full horizontal and vertical sums for the other three reference pixel arrays are computed in a similar manner.

In particular, the full horizontal sums for the reference pixel array depicted in FIG. 2C (i.e., whose origin is R1-C2) are R1C9+SH1; R2C9+SH2; R3C9+SH3; R4C9+SH4; R5C9+SH5; R6C9+SH6; R7C9+SH7; and, R8C9+SH8. These full horizontal sums are labeled in FIG. 4 as "HOR. SUMS RIGHT1". Similarly, the full vertical sums for the reference pixel array depicted in FIG. 2C are R1C2+SV2; R1C3+SV3; R1C4+SV4; R1C5+SV5; R1C6+SV6; R1C7+ SV7; R1C8+SV8; and, R1C9+SV9. These full vertical sums are labeled in FIG. 4 as "VERT. SUMS UP2".

The full horizontal sums for the reference pixel array depicted in FIG. 2D (i.e., whose origin is R2-C1) are R2C1+SH2; R3C1+SH3; R4C1+SH4; R5C1+SH5; R6C1+ SH6; R7C1+SH7; R8C1+SH8; and, R9C1+SH9. These full horizontal sums are labeled in FIG. 4 as "HOR. SUMS LEFT2". Similarly, the full vertical sums for the reference pixel array depicted in FIG. 2D are R9C1+SV1; R9C2+SV2; R9C3+SV3; R9C4+SV4; R9C5+SV5; R9C6+SV6; R9C7+ SV7; and, R9C8+SV8. These full vertical sums are labeled in FIG. 4 as "VERT. SUMS DOWN1".

The full horizontal sums for the reference pixel array depicted in FIG. 2E (i.e., whose origin is R2-C2) are R2C9+SH2; R3C9+SH3; R4C9+SH4; R5C9+SH5; R6C9+ SH6; R7C9+SH7; R8C9+SH8; and, R9C9+SH9. These full horizontal sums are labeled in FIG. 4 as "HOR. SUMS RIGHT2". Similarly, the full vertical sums for the reference pixel array depicted in FIG. 2E are R9C2+SV2; R9C3+SV3; R9C4+SV4; R9C5+SV5; R9C6+SV6; R9C7+SV7; R9C8+ SV8; and, R9C9+SV9. These full vertical sums are labeled in FIG. 4 as "VERT. SUMS DOWN2".

With continuing reference to FIG. 4, the "HOR. SUMS LEFT1" and the "VERT. SUMS UP1", which constitute the orthogonal sums (i.e., the orthogonal-sum signature) of the reference pixel array whose origin is R1-C1, are applied as inputs to a first MAE computation circuit ("Compute MAE1") 27, which receives at another input the corresponding orthogonal sums (i.e., orthogonal-sum signature) of the macroblock currently being encoded (i.e., the "coded macroblock"). The "HOR. SUMS RIGHT1" and the "VERT. SUMS UP2", which constitute the orthogonal sums (i.e., the orthogonal-sum signature) of the reference pixel array whose origin is R1-C2 are applied as inputs to a second MAE computation circuit ("Compute MAE2") 29, which receives at another input the corresponding orthogonal sums (i.e., orthogonal-sum signature) of the coded macroblock. The "HOR. SUMS LEFT2" and the "VERT. SUMS DOWN1", which constitute the orthogonal sums (i.e., the orthogonal-sum signature) of the reference pixel array whose origin is R2-C1 are applied as inputs to a third MAE computation circuit ("Compute MAE3") 31, which receives at another input the corresponding orthogonal sums (i.e., orthogonal-sum signature) of the coded macroblock. The "HOR. SUMS RIGHT2" and the "VERT. SUMS DOWN2", which constitute the orthogonal sums (i.e., the orthogonal sum signature) of the reference pixel array whose origin is R2-C2 are applied as inputs to a fourth MAE computation circuit ("Compute MAE4") 33, which receives at another input the corresponding orthogonal sums (i.e., orthogonal-sum signature) of the coded macroblock. With continuing reference to FIG. 4, it will be readily appreciated that the MAE computation circuits 27, 29, 31, and 33 compare the orthogonal-sum signatures of the respective reference pixel arrays with the orthogonal-sum signature of the coded macroblock, and then compute the respective MAEs (and/or any other suitable distortion function/search metric). Since these MAE computation circuits 27, 29, 31, and 33 are arranged in parallel, they operate to concurrently compute the respective MAEs. Finally, a selector circuit 35 (labeled "Select Best Out Of Four") receives the MAEs (MAE1–MAE4) output by the MAE computation circuits 27, 29, 31, and 33, and selects the lowest one as the best one, and outputs the result for further use in the motion estimation process.

Thus, in a single try (pass), the motion estimation search engine 20 of the exemplary embodiment of the present invention simultaneously compares the orthogonal sums of four macroblock locations (reference pixel arrays) in the anchor (reference) picture with the orthogonal sum of the coded macroblock in order to determine which of these four reference pixel arrays constitutes the best match according to the specified search metric (in this case, MAE). Of course, as has been previously stated, the present invention is not limited to any particular number of reference pixel arrays, e.g., the orthogonal-sum signatures of more or less than four reference pixel arrays can be concurrently computed, and then concurrently compared to the orthogonal-sum signature of the macroblock currently being encoded, in accordance with the principles of the present invention, to thereby concurrently perform multiple motion estimations in a single pass (try). Further, it should be recognized the methodology of the present invention only requires that the memory be written into only once, at the beginning of the motion estimation search process, with the partial orthogonal sums that are thereby stored being re-used extensively as the motion estimation search engine searches horizontally and vertically in the manner described hereinabove.

As stated previously, the computational complexity of the DFCU is a major factor in the cost of the motion estimation circuitry (search engine). However, since the motion estimation method of the present invention provides such a dramatic reduction in the cost and complexity of the DFCU, it becomes much more practical to start with undecimated or low-level decimated video for motion estimation searching, thereby dramatically improving motion estimation search accuracy, and ultimately, picture quality. In this connection, not only does the motion estimation method of the present invention allow a substantial reduction in the number of stages of motion estimation, but it also allows for the elimination of the special video filtering circuitry required for all eliminated decimation stages. With such hardware savings, the search process can potentially be started with the undecimated video producing a great quality improvement at reasonable cost.

Another advantage realized with the motion estimation method of the present invention is greatly enhanced speed of operation. Traditionally, multiple stages of logic are required in order to compare collocated luminance magnitudes, practically excluding the possibility of obtaining results in a single clock cycle. For this reason, either the system clock frequency has to be substantially reduced or the system has to be pipelined utilizing substantial logic resources. The motion estimation method of the present invention allows concurrent/parallel computation of multiple orthogonal sums to be easily achieved in a single clock cycle, followed by dramatically reduced MAE computation time due to concurrent/parallel computation of a plurality (e.g., four) of MAEs corresponding to a corresponding plurality (e.g., four) of reference pixel arrays in the search region of the reference picture.

In addition to these advantages, the invention greatly accelerates the motion estimation method using orthogonal-sum block matching disclosed in the previously referenced co-pending U.S. application Ser. No. 09/287,161.

Moreover, the present invention achieves the following three significant advantages over the presently available technology:

(1) Substantial hardware reduction due to hardware sharing in orthogonal-sum computations;

(2) Concurrent estimation of a multiple X (e.g., 4) of macroblock locations in a single step of the search using highly-shared hardware. The achieved X-times acceleration does not compromise the search quality compared to video decimation; and, (3) Full-search motion estimation algorithm can be implemented using the motion estimation method and apparatus of the present invention.

Although preferred embodiments of the present invention have been described in detail hereinabove, it should be clearly understood that many variations and/or modifications of the basic inventive concepts taught herein that may appear to those skilled in the pertinent art will still fall within the spirit and scope of the present invention, as defined in the appended claims.

What is claimed is:

1. A method for determining a best match between a first pixel array in a picture currently being encoded and a plurality of second pixel arrays in a search region of a reference picture, wherein each of the first and second pixel arrays includes a plurality R of rows and a plurality C of columns of individual pixel values, the method comprising the steps of:

providing a first full orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array;

providing a plurality of partial orthogonal-sum signatures for respective ones of the plurality of second pixel arrays, each of the plurality of partial orthogonal sum signatures being comprised of a set of partial horizontal sums representative of the sums of the individual pixel values of a plurality M of the rows of a respective one of the second pixel arrays and a set of partial vertical sums representative of the sums of the individual pixel values of a plurality N of the columns of a respective one of the second pixel arrays, wherein M<R and N<C, and wherein R is equal or unequal to C and M is equal or unequal to N;

computing a plurality of second full orthogonal-sum signatures for the respective ones of the plurality of second pixel arrays using the plurality of partial orthogonal-sum signatures; and, comparing the first full orthogonal-sum signature with each of the second full orthogonal-sum signatures in order to determine the best match between the first and second pixel arrays.

2. The method as set forth in claim 1, wherein N=C−1 and M=R−1.

3. The method as set forth in claim 2, wherein:

the set of partial horizontal sums is representative of the sums of the individual pixel values contained in N columns of R+1 rows of an (C+1)-by-(R+1) pixel array that encompasses all of the second pixel arrays, and the set of partial vertical sums is representative of the sums of the individual pixel values contained in M rows of C+1 columns of the (C+1)-by-(R+1) pixel array;

the R+1 rows and the C+1 columns collectively comprise the (C+1)-by-(R+1) pixel array that encompasses all of the second pixel arrays; and, the M rows and N columns are centered in the (C+1)-by-(R+1) pixel array.

4. The method as set forth in claim 1, wherein the comparing step is performed using a prescribed best match search metric.

5. The method as set forth in claim 4, wherein the prescribed best match search metric is a Minimum Absolute Error (MAE) search metric.

6. The method as set forth in claim 3, wherein the comparing step is performing using a prescribed best match search metric.

7. The method as set forth in claim 1, wherein each of the first and second pixel arrays is a macroblock having a structure defined by an MPEG standard.

8. The method as set forth in claim 3, wherein each of the first and second pixel arrays is a macroblock having a structure defined by an MPEG standard.

9. The method as set forth in claim 1, wherein each of the first and second pixel arrays is an undecimated macroblock.

10. The method as set forth in claim 1, wherein each of the first and second pixel arrays is a decimated macroblock.

11. The method as set forth in claim 1, wherein the method is implemented using a motion estimation search engine of a digital video encoder.

12. The method as set forth in claim 11, wherein the digital video encoder is an MPEG-2 digital video encoder.

13. The method as set forth in claim 1, wherein the step of providing a plurality of partial orthogonal-sum signatures is performed by first computing each of the partial horizontal sums and each of the partial vertical sums and then storing the computed partial horizontal and vertical sums in a memory.

14. The method as set forth in claim 3, wherein the step of computing the plurality of second full orthogonal-sum signatures is performed by:

computing, for each of the second pixel arrays, a set of full vertical sums, by adding to each partial vertical sum, a pixel value from a selected row of the (C+1)-by-(R+1) pixel array that is above or below, as appropriate, the M rows; and, computing, for each of the second pixel arrays, a set of full horizontal sums, by adding to each partial horizontal sum, a pixel value from a selected column of the (C+1)-by-(R+1) pixel array that is above or below, as appropriate, the N columns.

15. The method as set forth in claim 14, wherein the sub-step of computing, for each of the second pixel arrays, a set of full vertical sums, and the sub-step of computing, for each of the second pixel arrays, a set of full horizontal sums, are performed concurrently.

16. The method as set forth in claim 1, wherein the step of computing a plurality of second full orthogonal-sum signatures for the respective ones of the plurality of second pixel arrays using the plurality of partial orthogonal-sum signatures is performed by concurrently computing each of the second full orthogonal-sum signatures.

17. The method as set forth in claim 3, wherein the step of computing a plurality of second full orthogonal-sum signatures for the respective ones of the plurality of second pixel arrays using the plurality of partial orthogonal-sum signatures is performed by concurrently computing each of the second full orthogonal-sum signatures.

18. A device that implements the method set forth in claim 1.

19. A device that implements the method set forth in claim 7.

20. A device that implements the method set forth in claim 17.

21. A motion estimation search engine for determining a best match between a first pixel array in a picture currently being encoded and a plurality of second pixel arrays in a search region of a reference picture, wherein each of the first and second pixel arrays includes a plurality R of rows and a plurality C of columns of individual pixel values, the motion estimation search engine including:

circuitry that provides a first full orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array;

circuitry that provides a plurality of partial orthogonal-sum signatures for respective ones of the plurality of second pixel arrays, each of the plurality of partial orthogonal-sum signatures being comprised of a set of partial horizontal sums representative of the sums of the individual pixel values of a plurality M of the rows of a respective one of the second pixel arrays and a set of partial vertical sums representative of the sums of the individual pixel values of a plurality N of the columns of a respective one of the second pixel arrays, wherein M<R and N<C, and wherein R is equal or unequal to C and M is equal or unequal to N;

circuitry that computes a plurality of second full orthogonal-sum signatures for the respective ones of the plurality of second pixel arrays using the plurality of partial orthogonal-sum signatures; and, circuitry that compares the first full orthogonal-sum signature with each of the second full orthogonal-sum signatures in order to determine the best match between the first and second pixel arrays.

22. The motion estimation search engine as set forth in claim 21, wherein each of the first and second pixel arrays is a macroblock having a structure defined by an MPEG standard.

23. The motion estimation search engine as set forth in claim 21, wherein the motion estimation search engine is incorporated into a digital video encoder.

24. The motion estimation search engine as set forth in claim 21, wherein:

N=C−1 and M=R−1;

the set of partial horizontal sums is representative of the sums of the individual pixel values contained in N columns of R+1 rows of an (C+1)-by-(R+1) pixel array that encompasses all of the second pixel arrays, and the set of partial vertical sums is representative of the sums of the individual pixel values contained in M rows of C+1 columns of the (C+1)-by-(R+1) pixel array;

the R+1 rows and the C+1 columns collectively comprise the (C+1)-by-(R+1) pixel array that encompasses all of the second pixel arrays; and, the M rows and N columns are centered in the (C+1)-by-(R+1) pixel array.

25. The motion estimation search engine as set forth in claim 21, wherein the circuitry that compares determines the best match between the first and second pixel arrays using a prescribed best match search metric.

26. The motion estimation search engine as set forth in claim 25, wherein the prescribed best match search metric is a Minimum Absolute Error (MAE) search metric.

27. The motion estimation search engine as set forth in claim 24, wherein the circuitry that provides a plurality of partial orthogonal-sum signatures operates to first compute each of the partial horizontal sums and each of the partial vertical sums and to then store the computed partial horizontal and vertical sums in a memory.

28. The motion estimation search engine as set forth in claim 24, wherein the circuitry that computes the plurality of second full orthogonal-sum signatures operates to:

compute, for each of the second pixel arrays, a set of full vertical sums, by adding to each partial vertical sum, a pixel value from a selected row of the (C+1)-by-(R+1) pixel array that is above or below, as appropriate, the M rows; and, compute, for each of the second pixel arrays, a set of full horizontal sums, by adding to each partial horizontal sum, a pixel value from a selected column of the (C+1)-by-(R+1) pixel array that is above or below, as appropriate, the N columns.

29. The motion estimation search engine as set forth in claim 21, wherein the circuitry that computes the plurality of second full orthogonal-sum signatures operates to concurrently compute each of the second full orthogonal-sum signatures.

30. A motion estimation search engine for determining a best match between a first pixel array in a picture currently being encoded and a plurality of second pixel arrays in a search region of a reference picture, wherein each of the first and second pixel arrays includes a plurality R of rows and a plurality C of columns of individual pixel values, the motion estimation search engine including:

means for providing a first full orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array;

means for providing a plurality of partial orthogonal-sum signatures for respective ones of the plurality of second pixel arrays, each of the plurality of partial orthogonal-sum signatures being comprised of a set of partial horizontal sums representative of the sums of the individual pixel values of a plurality M of the rows of a respective one of the second pixel arrays and a set of partial vertical sums representative of the sums of the individual pixel values of a plurality N of the columns of a respective one of the second pixel arrays, wherein M<R and N<C, and wherein R is equal or unequal to C and M is equal or unequal to N;

means for computing a plurality of second full orthogonal-sum signatures for the respective ones of the plurality of second pixel arrays using the plurality of partial orthogonal-sum signatures; and, means for comparing the first full orthogonal-sum signature with each of the second full orthogonal-sum signatures in order to determine the best match between the first and second pixel arrays.

31. The motion estimation search engine as set forth in claim 30, wherein N=C−1 and M=R1.

32. The motion estimation search engine as set forth in claim 31, wherein:

the set of partial horizontal sums is representative of the sums of the individual pixel values contained in N columns of R+1 rows of an (C+1)-by-(R+1) pixel array that encompasses all of the second pixel arrays, and the set of partial vertical sums is representative of the sums of the individual pixel values contained in M rows of C+1 columns of the (C+1)-by-(R+1) pixel array;

the R+1 rows and the C+1 columns collectively comprise the (C+1)-by-(R+1) pixel array that encompasses all of the second pixel arrays; and, the M rows and N columns are centered in the (C+1)-by-(R+1) pixel array.

\* \* \* \* \*